230. GAS PUMPS AND FANS
179
EXAMINER
No. 848,311. PATENTED MAR. 26, 1907.
J. C. KITTON.
DOUBLE VALVE.
APPLICATION FILED NOV. 27, 1905.
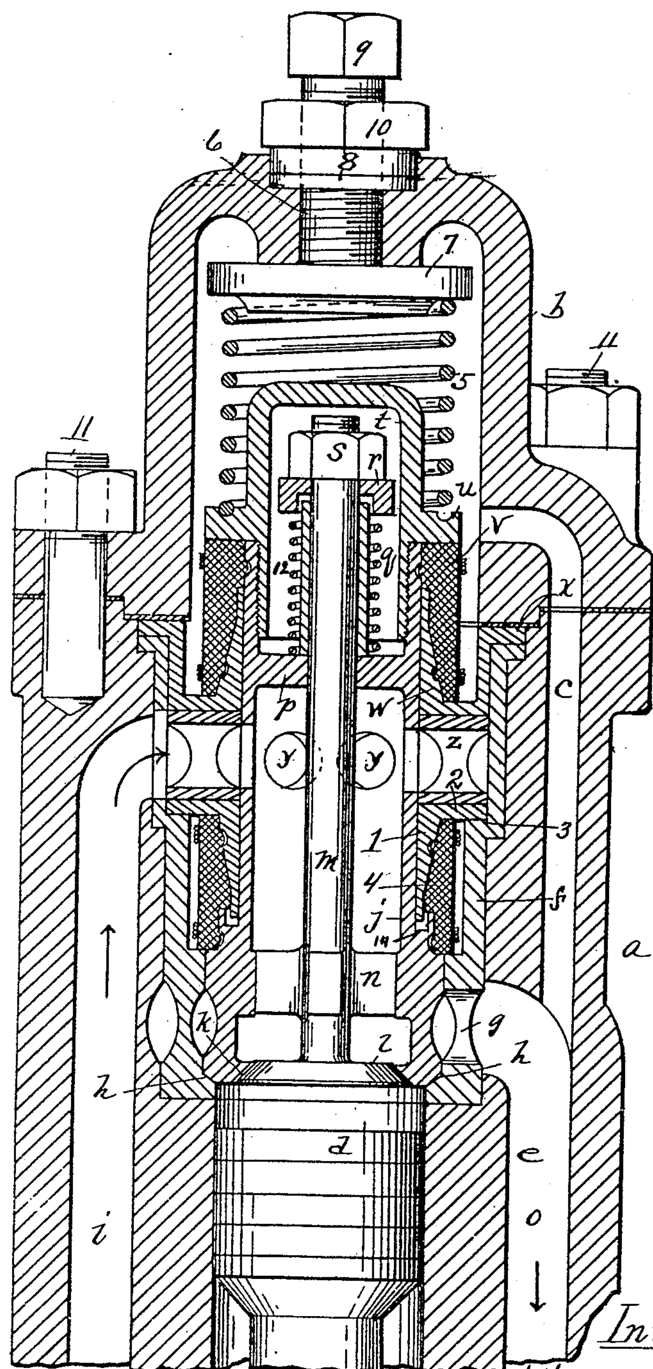
Witnesses.
O. B. Baenziger.
A. M. Murphy.
Inventor.
John C. Kitton
By Newell S. Wright
His Attorney.

UNITED STATES PATENT OFFICE.

JOHN C. KITTON, OF DETROIT, MICHIGAN.

DOUBLE VALVE.

No. 848,311. Specification of Letters Patent. Patented March 26, 1907.

Application filed November 27, 1905. Serial No. 289,264.

*To all whom it may concern:*

Be it known that I, JOHN C. KITTON, a citizen of the United States, residing at Detroit, county of Wayne, State of Michigan, have invented a certain new and useful Improvement in Double Valves, of which the following is a specification, reference being had to the accompanying drawing, which forms a part of this specification.

My invention has for its object to provide a double valve. While I do not limit myself to any special use to which the same may be applied, my improved valve is especially adapted for use as an elastic-fluid-compressor valve—as, for example, an ammonia-compressor valve.

As applied to an elastic-fluid-compressor mechanism my improved double valve is designed more particularly to control the inlet of the fluid into a compression-cylinder to compress the fluid by the action of a piston in said cylinder, the valve mechanism controlling the discharge of the compressed fluid from said cylinder.

My invention is designed especially to accomplish the ends in view in a simple, economical, and efficient manner.

I carry out my invention as hereinafter described and claimed, and illustrated in the accompanying drawing, said drawing being a longitudinal section of mechanism embodied herein.

In the drawing, *a* represents a casing, and *b* a hood therefor secured thereupon in any suitable manner, said casing and said hood provided with an equalizing-channel, (indicated at *c*.) A piston is indicated at *d*, reciprocatory in a cylinder *e*. A cage *f* is fitted upon the end of the cylinder, provided with an opening at *g* therethrough toward one end thereof and with a valve-seat, (indicated at *h*.) Between the cylinder and the case *a* is a discharge-passage, (indicated at *o*,) communicable through the opening *g* of the cage. Between the cylinder and the case *a* is also formed an inlet-passage, (indicated at *i*.) A tubular discharge-controlling valve *j* is located within the cage and seats upon the seat *h*, said valve *j* being formed with a valve-seat therewithin at one end thereof, (indicated at *k*.) An inlet-valve *l* seats upon the seat *k* of the discharge-valve, the inlet-valve being provided with a stem *m*, said stem being provided with a guide-flange *n* above the valve *l*. The valve *j* is provided also with the flange *p*, through which the valve-stem *m* passes. A valve-stem guide or tubular collar is located upon said flange, as indicated at *q*. A washer *r* is located above the upper end of the guide *q*, secured upon the end of the valve-stem and normally spaced a desired distance from the upper end of the guide or collar *q*. A spring 12 is located between said washer and the flange *p* about said guide to aid in seating the inlet-valve when the valve is free to move. A nut *s* is engaged upon the upper end of the valve-stem above said washer. A cap *t* is secured upon the upper end of the discharge-valve, said cap being shown in threaded engagement with the upper end of said valve and provided with a flange *u*.

A rubber or other suitable flexible or elastic diaphragm is indicated at *v* about the upper end of the discharge-valve, said diaphragm being securely engaged at its upper end upon the discharge-valve, the opposite end of the diaphragm being securely engaged upon a stationary part of the structure, preferably upon a stationary collar *w*, provided with a flange *x*, resting upon the upper end of the cage *f*. Said collar is preferably formed with a hub projecting upward a desired distance behind the diaphragm, as shown. The discharge-valve *j* is constructed with openings *y*, registering with a channeled drum *z*, opening into the channel *i*, said drum being supported upon a stationary part of the construction, as upon a collar, (indicated by the numeral 1,) said collar provided with a flange 2, resting upon a shoulder 3 of the cage *f*. Said collar is preferably provided with a hub encircling the discharge-valve *j*, about which and upon which is securely engaged the upper end of a lower rubber or other suitable flexible or elastic diaphragm 4. The lower end of the diaphragm 4 is securely engaged upon the discharge-valve, thereby making a perfect gas seal.

It will be apparent that the gas enters the discharge-valve between the two seals or elastic diaphragms *v* and 4, my invention providing in this manner a perfect gas-tight seal both above and below the entrance of the gas into the discharge-valve. I thus provide a perfect seal of the high pressure from the low pressure. Experience has shown convincingly that in devices of this character no ordinary packing-rings will secure this result and keep the high pressure apart from the low pressure.

Above the flange *u* of the cap *t* is a spring, (indicated at 5,) simply to give life to the action of the valve. The hood *b* is shown provided with a screw 6, provided with a head 7, bearing against the adjacent end of the spring 5, said screw being provided with suitable packing 8, head 9, and lock-nut 10. The hood *b* is secured upon the case *a* in any suitable manner, as by bolts 11.

It will be apparent that the inlet-valve is movable longitudinally of the stem within the discharge-valve and seats upon the discharge-valve beneath the lower end of the collar 1. The valve *j* is provided with a shoulder (indicated at 14) normally spaced a slight distance from the lower end of said collar. It will be observed that the cap *t*, with its flange *u*, affords a larger area of surface for pressure to exert itself upon than the area of surface at the lower end of the valve *j*. The condensing pressure admitted through the channel *c* upon the upper end of the valve *j* will therefore normally hold the valve *j* to its seat. My present invention contemplates this as one of its leading features, the spring 5, as already observed, being simply employed to give life or activity to the valve. The elastic diaphragms *v* and 4 are, as above stated, for the purpose of effectually sealing the pressure within the valve *j* from the outer pressure, the condensing pressure being obviously the greater.

In operation the fluid at any desired pressure enters through the inlet-channel *i* and through the drum *z* and orifices *y* into the compression or discharge valve. It will readily be seen that when the piston is retracted the inlet-valve *l* will be unseated, permitting the fluid to enter into the adjacent end of the cylinder *e*. Upon the opposite movement of the piston toward the valves the inlet-valve is seated, permitting the compression of the fluid within the cylinder up to a desired degree. When the condensing pressure upon the valve is overcome by the compression force exerted by the forward stroke of the piston, the discharge-valve is lifted off from its seat upon the cage, permitting the discharge of the compressed fluid through the opening *g* of the cage and through the channel *o*.

It will be perceived that the inlet-valve *l* can only be unseated the distance between the upper end of the guide *q* and the adjacent washer *r*. It will also be observed that the valve *j* can only be lifted the distance between the lower end of the collar or hub 1 and the shoulder 14 of said valve.

My invention contemplates setting the piston to lift a little beyond the seat of the discharge-valve, the lift of the discharge-valve being governed, as above set forth, by the distance between the hub 1 and the shoulder 14, so that when the piston is at the end of its upper stroke the valve is still a fraction of an inch above the top of the piston. When the piston starts to return, the valve falls down upon the end of the piston, thereby eliminating all gas above the piston, the valve riding back to its seat upon the top of the piston. The operation of the double valve will now be readily understood.

I do not limit myself solely to the employment of the cage, as it might be dispensed with without departing from the principle of my invention.

What I claim as my invention is—

1. In a valve the combination of a case, a piston-cylinder, a piston within the cylinder, a discharge-channel communicable with the cylinder, a hollow discharge-valve to control the communication of the cylinder with the discharge-channel, an inlet-channel communicable with the cylinder, an inlet-valve to control the communication of the cylinder with the inlet-channel, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, and means to admit condenser-pressure upon the upper end of the discharge-valve to seat the discharge-valve, the discharge-valve being unseated by the piston-pressure when the piston-pressure overcomes the condenser-pressure.

2. In a valve the combination of a case, a piston-cylinder, a piston within the cylinder, a discharge-channel communicable with the cylinder, a hollow discharge-valve to control the communication of the cylinder with the discharge-channel, an inlet-channel communicable with the cylinder, an inlet-valve to control the communication of the cylinder with the inlet-channel, an elastic diaphragm about the discharge-valve located above the communication of the inlet-valve with the cylinder an additional elastic diaphragm located below the communication of the inlet-valve with the cylinder to seal the pressure within the discharge-valve from the outer pressure upon the discharge-valve, and means to admit condenser-pressure upon the upper end of the discharge-valve to seat the discharge-valve, the discharge-valve being unseated by the piston-pressure when the piston-pressure overcomes the condenser-pressure.

3. In a valve the combination of a case, a piston-cylinder, a piston within the cylinder, a discharge-channel communicable with the cylinder, a hollow discharge-valve to control the communication of the cylinder with the discharge-channel, an inlet-channel communicable with the cylinder, an inlet-valve to control the communication of the cylinder with the inlet-channel, an elastic diaphragm about the discharge-valve located above the

PUMPS AND FANS communication of the inlet-valve with the cylinder, an additional elastic diaphragm located below the communication of the inlet-valve with the cylinder, to seal the pressure within the discharge-valve from the outer pressure upon the discharge-valve, and means to admit condenser-pressure upon the upper end of the discharge-valve above the upper diaphragm to seat the discharge-valve, the discharge-valve being unseated by the piston-pressure when the piston-pressure overcomes the condenser-pressure.

4. In a valve the combination of a case, a piston-cylinder, a piston within the cylinder, a cage resting upon one end of the cylinder, a hollow discharge-channel communicable with the cylinder, a discharge-valve seated upon the cage to control the communication of the cylinder with the discharge-channel, an inlet-channel communicable with the cylinder, an inlet-valve seated within the discharge-valve to control the communication of the cylinder with the inlet-channel, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, and means to admit condenser-pressure upon the upper end of the discharge-valve to seat the discharge-valve, the discharge-valve being unseated by the piston-pressure when the piston-pressure overcomes the condenser-pressure.

5. The combination with a case, of a cylinder, a piston reciprocatory in said cylinder, a cage resting upon the adjacent end of the cylinder, a hollow discharge-valve within the cage seated upon one end of the cage and provided with an inner seat, an inlet-valve seated upon the seat of the discharge-valve, a discharge-channel communicable through the cage into said cylinder, an inlet-channel communicable through the discharge-valve into said cylinder, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, and means to communicate condenser-pressure upon the upper end of the discharge-valve to seat the discharge-valve, the inlet-valve being seated by the pressure within the cylinder, the discharge-valve being unseated by the piston-pressure when the piston-pressure overcomes the condenser-pressure.

6. In a valve the combination of a case, a piston-cylinder, a piston reciprocatory within the cylinder, a discharge-channel communicable with the cylinder, a hollow discharge-valve to control the communication of the cylinder with the discharge-channel, an inlet-channel communicable with the cylinder, an inlet-valve seated within the discharge-valve and movable longitudinally of the discharge-valve to control the communication of the inlet-passage with the cylinder, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, means whereby condenser-pressure may be communicated upon the upper end of the discharge-valve to seat the discharge-valve, and means to seat the inlet-valve when the pressure of the piston is removed, the discharge-valve being unseated by the piston-pressure, when the piston-pressure overcomes the condenser-pressure.

7. A fluid-compressor valve comprising a cylinder, a piston therewithin, an inlet-channel communicable with the cylinder, an inlet-valve to control the communication of the cylinder with the inlet-channel, a discharge-channel communicable with the cylinder, a discharge-valve to control the communication of the cylinder with the discharge-channel, an elastic diaphragm above the communication of the inlet-channel with the cylinder engaged at its lower end with a stationary part of the device and at its upper end engaged with the discharge-valve, an additional elastic diaphragm below the communication of the inlet-channel with the cylinder engaged at its lower end with the discharge-valve and at its upper end with a stationary part of the device, and means to admit condenser-pressure upon the upper end of the discharge-valve, the inlet-valve opened by the exhaust stroke of the piston, and the discharge-valve opened by the advance stroke of the piston, the discharge-valve being unseated by the piston-pressure when the piston-pressure overcomes the condenser-pressure thereupon.

8. In a valve the combination of a case, a piston-cylinder, a piston within the cylinder, a discharge-channel communicable with the cylinder, a hollow discharge-valve to control the communication of the cylinder with the discharge-channel, an inlet-channel communicable with the cylinder, an inlet-valve to control the communication of the cylinder with the inlet-channel, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, and means to admit condenser-pressure upon the upper end of the discharge-valve to seat the discharge-valve, the discharge-valve being unseated by the piston-pressure when the piston-pressure overcomes the condenser-pressure, the discharge-valve movable from its seat beyond the advance stroke of the piston.

9. In a valve the combination of a case, a piston-cylinder, a piston within the cylinder, a discharge-channel communicable with the cylinder, a hollow discharge-valve to control the communication of the cylinder with the discharge-channel, an inlet-channel communicable with the cylinder, an inlet-valve to control the communication of the cylinder with the inlet-channel, sealing means about the discharge-valve located above the communication of the inlet-valve with the cylinder additional sealing means located about the discharge-valve below the communication of the inlet-valve with the cylinder to seal the pressure within the discharge-valve from the outer pressure upon the discharge-valve, means to admit condenser-pressure upon the upper end of the discharge-valve to seat the discharge-valve, the discharge-valve being unseated by the piston-pressure when the piston-pressure overcomes the condenser-pressure, and means to limit the unseating of said valve.

In testimony whereof I have signed this specification in the presence of two subscribing witnesses.

JOHN C. KITTON.

Witnesses:
N. S. WRIGHT,
A. M. MURPHY.